United States Patent
Yoo et al.

(10) Patent No.: US 6,804,455 B1
(45) Date of Patent: Oct. 12, 2004

(54) METHOD AND APPARATUS FOR TRANSCEIVING AUDIO DATA STREAM THROUGH A DIGITAL INTERFACE

(75) Inventors: Jea-Yong Yoo, Seoul (KR); Kang-Soo Seo, Seoul (KR); Byung-Jin Kim, Seoul (KR); Changhwan Jang, Sungnam (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/572,495

(22) Filed: May 18, 2000

(30) Foreign Application Priority Data

May 20, 1999 (KR) ................................ 10-1999-0018329

(51) Int. Cl.$^7$ ................................................. H04N 5/91
(52) U.S. Cl. ............................ 386/95; 386/96; 386/97; 348/462
(58) Field of Search ................................ 348/461, 462, 348/473, 484; 375/220, 242; 386/95, 96, 97

(56) References Cited

U.S. PATENT DOCUMENTS

| | | | | |
|---|---|---|---|---|
| 5,650,825 A | * | 7/1997 | Naimpally et al. | 348/465 |
| 5,745,645 A | * | 4/1998 | Nakamura et al. | 386/131 |
| 5,856,973 A | * | 1/1999 | Thompson | 348/461 |
| 5,907,659 A | * | 5/1999 | Yamauchi et al. | 386/95 |
| 5,959,659 A | * | 9/1999 | Dokic | 375/240.25 |
| 5,987,417 A | * | 11/1999 | Heo et al. | 386/96 |

FOREIGN PATENT DOCUMENTS

JP 11-298891 10/1999

* cited by examiner

Primary Examiner—Vincent Boccio
Assistant Examiner—James A Fletcher
(74) Attorney, Agent, or Firm—Birch, Stewart, Kolasch & Birch, LLP

(57) ABSTRACT

The present invention relates to a method and apparatus for transceiving audio data reproduced from a recording medium such as a digital video disk (DVD) through a digital interface such as IEEE 1394. The transmitting method according to the present invention separates an audio data stream from data reproduced from a recording medium, inserts the separated audio data stream into the private data area of an MPEG-formatted data stream, and transmits the MPEG-formatted data stream containing the audio data stream in the private data area through a digital communication line. The receiving method according to the present invention checks whether or not an MPEG-formatted data stream received through a digital interface includes the private data area, extracts audio data inserted in the private data area, and decodes the extracted audio data. As a result, the present invention does not require the conventional re-encoding process after decoding. Therefore, the present invention prevents possible loss of audio data such as LPCM audio data caused from the re-encoding operation as well as reduces device cost.

12 Claims, 5 Drawing Sheets

PES Packet Syntax Diagram

*Conventional Art*

FIG. 5

| stream_id | stream coding |
|---|---|
| 1011 1100 | program_stream_map |
| 1011 1101 | private_stream_1 |
| 1011 1110 | padding stream |
| 1011 1111 | private_stream_2 |
| 110x xxxx | ISO/IEC 13818-3 or ISO/IEC 11172-3 Audio stream number x xxxx |
| 1110 xxxx | ITU_T Rec.H.262I ISO/IEC 13818-2 or ISO/IEC 11172-2 Video Stream number xxxx |
| 1111 0000 | ECM_stream |
| 1111 0001 | EMM_stream |
| 1111 0010 | ITU_T Rec.H.222.0I ISO/IEC 13818-1 Annex B or ISO/IEC 13818-6_DSMCC_stream |
| 1111 0011 | ISO/IEC_13522_stream |
| 1111 0100 | ITU_T Rec. H.222.1. type A |
| 1111 0101 | ITU_T Rec. H.222.1. type B |
| 1111 0110 | ITU_T Rec. H.222.1. type C |
| 1111 0111 | ITU_T Rec. H.222.1. type D |
| 1111 1000 | ITU_T Rec. H.222.1. type E |
| 1111 1001 | Ancillary_stream |
| 1111 1010... 1111 1110 | Reserved data stream |
| 1111 1111 | Program_stream_directory |

Stream_id assignments

*Conventional Art*

METHOD AND APPARATUS FOR TRANSCEIVING AUDIO DATA STREAM THROUGH A DIGITAL INTERFACE

BACKGROUND OF THE INVENTION

1. Field of the Invention

The present invention relates to method and apparatus for transceiving audio data reproduced from a recording medium such as a digital versatile disk (DVD) through a digital interface such as IEEE 1394.

2. Description of the Related Art

The standardization for a recently developed disk-type recording medium, especially a digital versatile disk (referred as 'DVD' hereinafter) has been rapidly developed among related companies, so it is expected that a DVD is going to be widely used. Also, a digital video/audio reproducing apparatus capable of providing high-quality video and audio, for example, a digital TV (referred as 'D-TV' hereinafter) displaying high-quality digital video/audio signals reproduced from a DVD or received through a satellite will be popularized in the near future.

Accordingly, a method using a DVD player or a DVD recording/reproducing device in connection with a D-TV is expected to be rapidly increased, and a digital communication standard of IEEE 1394 which is sure to be adopted for data transmission between A/V apparatuses.

A data reproducer reproducing data recorded on a DVD differently processes digital data stream of MPEG format, especially a program stream (referred as 'PS' hereinafter) depending upon whether the data stream contains a presentation data or a navigation data. The presentation data is processed to yield video and audio, and the navigation data is used for controlling data reproducing operation of a DVD player.

Contrary to a DVD player, a D-TV processes digital data streams of MPEG format organized with transport streams (referred as 'TS' hereinafter) into presentation data, and converts them into video and audio signals. Accordingly, a DVD player should convert PS into TS before transmission, or a D-TV should convert received PS into TS before signal processing.

The difference between PS and TS is as follows.

The PS consists of several packs and each pack consists of packetized elementary stream (PES) packets containing digitized video, audio, and additional information data. A PES packet can contain data whose size is variable so that the size of a PES packet may not be same all the time.

On the contrary, the TS consists of transport packets and each packet has a fixed length of 188 bytes including its packet header.

Accordingly, when converting PS into TS, each PES packet of PS should be divided into packets of TS sequentially and necessary header information is added to each divided TS packet at that time. Because a PES packet is divided into multiple TS packets, remaining area of the last TS packet is stuffed with null data after writing all data of a PES packet in the multiple TS packets.

Audio data of high quality modulated in liner pulse code modulation (referred as 'LPCM' hereinafter) method may be included in digital data streams recorded in a DVD, so that a DVD player should convert LPCM audio data, if they are included in the reproduced digital data streams, into data packets whose format is able to be processed in a D-TV.

For such conversion, after a DVD player decodes LPCM audio data included in the data streams reproduced from a DVD, it re-encodes the decoded audio data into MPEG-formatted audio data or AC3-formatted audio data which is able to be processed in a D-TV, then transmits re-encoded audio data to a D-TV through a digital interface such as IEEE 1394.

Accordingly, a re-encoder is inevitably equipped in a DVD player for decoding LPCM audio data reproduced from a DVD and re-encoding them MPEG-formatted or AC3-formatted audio data. However, these decoding and re-encoding procedures requires additional hardware which increases manufacturing cost. Moreover, data processing is delayed and original LPCM audio data might be lost due to the re-encoding step.

SUMMARY OF THE INVENTION

It is an object of the present invention to provide method and apparatus for transceiving audio data stream through a digital interface, which are able to map specific formatted audio data, especially LPCM audio data reproduced from a recording medium such as a DVD into MPEG-formatted data streams without re-converting and transmit them at a transmitting side, check the received data streams on whether they includes LPCM audio, and retrieve and decode LPCM audio data inserted in the received data streams at a receiving side.

A method for transmitting audio data stream through a digital interface according to the present invention comprises the steps of separating audio data stream from data reproduced from a recording medium, inserting the separated audio data stream into the private data area of MPEG-formatted data stream, and transmitting the MPEG-formatted data stream containing audio data stream in the private data area through the digital interface.

A method for receiving audio data stream through a digital interface according to the present invention comprises the steps of checking whether or not a MPEG-formatted data stream received through the digital interface includes the private data area, extracting audio data inserted in the private data area, and decoding the extracted audio data.

A disk reproducing apparatus to which audio data stream transmitting method according to the present invention is applied comprises a detecting means for detecting digital data stream recorded in a recording medium; a separating means for separating audio data from the detected-data stream, a converting means for constructing MPEG-formatted data stream whose the private data area is packed with the separated audio data and converting the constructed stream into packets of transmittal format together with digital data stream of which audio data is separated; and a transmitting means for sending the packets of transmittal format through a digital communication interface.

An A/V apparatus to which audio data stream receiving method according to the present invention comprises a receiving means for receiving digital-data stream transmitted through a digital communication interface; a extracting means for checking whether the received MPEG-formatted data stream includes the private data area and extracting audio data inserted in the private data area; and a decoding means for decoding the extracted audio data.

In the present invention, the transmitting side inserts audio data, especially LPCM audio data reproduced from a disk-type recording medium such as a DVD into the private data area of a MPEG-formatted data stream, which may be distinguished from the MPEG-formatted video/audio data streams, and transmits through a digital communication line.

The receiving side checks whether the data streams received through the digital communication line includes the private data area and then decodes LPCM audio data inserted in the private stream if there are LPCM audio data. According to the above procedures, the present invention can deliver high-quality LPCM audio data recorded in a recording medium to other device without re-encoding.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 5 is a table showing stream identification information of a data stream transceived through a digital interface.

DETAILED DESCRIPTION OF THE PREFERRED EMBODIMENT

In order that the invention may be fully understood, preferred embodiments thereof will now be described with reference to the accompanying drawings.

Figure 1:
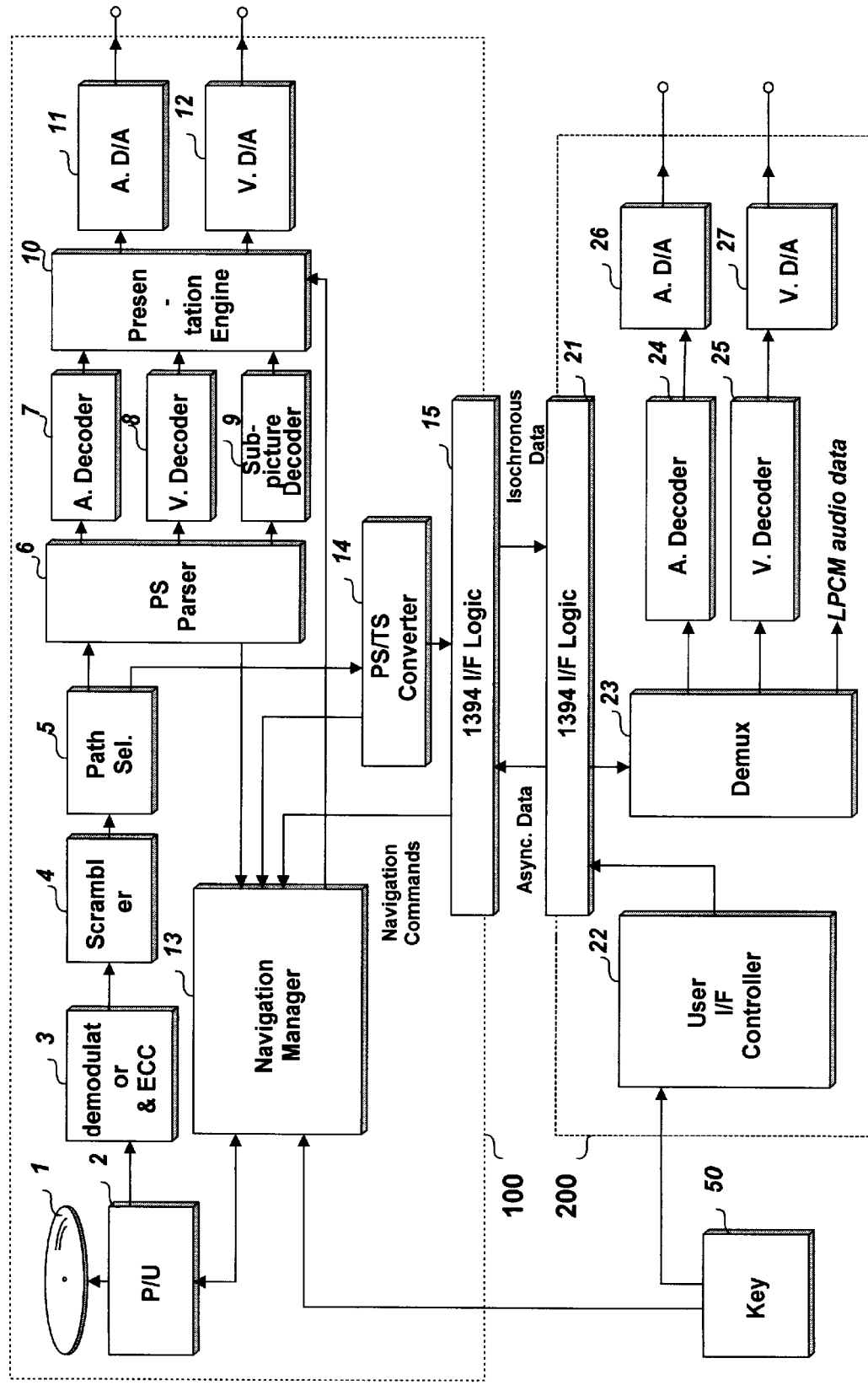
FIG. 1 is a simplified block diagram of an optical disk apparatus and a digital video/audio displaying apparatus which equip with digital interface according to the present invention.

FIG. 1 is a simplified block diagram of a DVD player and a D-TV to which an embodiment of the present invention is applied.

The DVD player 100 in FIG. 1 comprises an optical disk 1 such a DVD; an optical pickup 2 for detecting data recorded in the optical disk 1; a demodulator 3 for demodulating and error-correcting the detected data; a scrambler 4 (or a copy protecting device) for scrambling data outputted from the demodulator 3 with copy protecting codes; a path selector 5 for selecting one or two output path for data scrambled with the copy protecting codes; a data parser 6 for parsing data streams, that is, PS received through the path selector 5 into presentation and navigation data and then parsing the presentation data into audio, video and sub-picture data again; decoders 7, 8, and 9 for decoding the parsed audio, video and sub-picture data into uncompressed data respectively; a presentation engine 10 for combining the decoded audio, video and sub-picture data into digital audio signal and video signal; D/A converters 11 and 12 for converting the digital audio and digital video into corresponding analog signals respectively; a navigation manager 13 for controlling reproduction operation for the optical disk 1 depending upon the navigation data from the data parser 6 when there is a user's request; a PS/TS converter 14 for converting the PS outputted from the path selector 5 into TS; and an interface 15 for transmitting the converted TS through a IEEE 1394 digital communication line.

And the D-TV 200 in FIG. 1 comprises an interface 21 for receiving TS from the DVD player 100 through the IEEE 1394 digital communication line; a demux 23 for demuxing the received TS into audio and video data; decoders 24 and 25 for decoding the audio and video data into uncompressed audio and video data respectively; D/A converters 26 and 27 for converting the uncompressed digital data into corresponding analog audio and video signals respectively; and a user interface controller 22 for generating control signal for each element corresponding to a user's key input.

A key entering means 50 such as a remote controller for controlling operation of the DVD player 100 and the D-TV 200 is also shown in FIG. 1.

At the transmitting side of the DVD player 100, recorded signals detected from the optical disk 1 by the optical pickup 2 are demodulated into PS by the demodulator 3. The PS is separated into audio, video and sub-picture data of MPEG format by the data parser 6, and the MPEG-formatted data are converted into audio and video signals by the decoders 7, 8, and 9, the presentation engine 10, and the D/A converters 11 and 12. Also, the PS is sent to the PS/TS converter 14 through the path selector 5. The PS/TS converter 14 decodes the PS and interprets the stream identification number (referred as 'Stream ID' hereinafter), sorts out the PS into program specific information (PSI) for controlling program presentation, presentation data containing audio and video data, and system clock data.

The program specific information and system clock data are used as information for controlling presentation of program and system clock synchronization, respectively.

The presentation data are separated into audio, video and sub-picture data again, and are converted into TS which are delivered to the D-TV 200 through the IEEE 1394 interfaces 15 and 21.

At the receiving side of the D-TV 200, the demux 23, the decoders 24 and 25, and the D/A converters 26 and 27 process TS received through the interface 21 to output audio and video signals to a viewer.

If LPCM audio data, which contains eight channel sounds of high quality, are reproduced from the DVD player 100, they are mapped into a PES private data area of the MPEG-formatted private stream instead of being re-encoding into MPEG-formatted data, then divided into TS packets. The PES packets of the private stream containing LPCM audio in the private data area are converted into TS which is transmitted through the interface 15.

In order that the transceiving operation of LPCM audio data may be fully understood, a detailed mapping and converting operation process will now be described with reference to the accompanying drawings.

Figure 2:
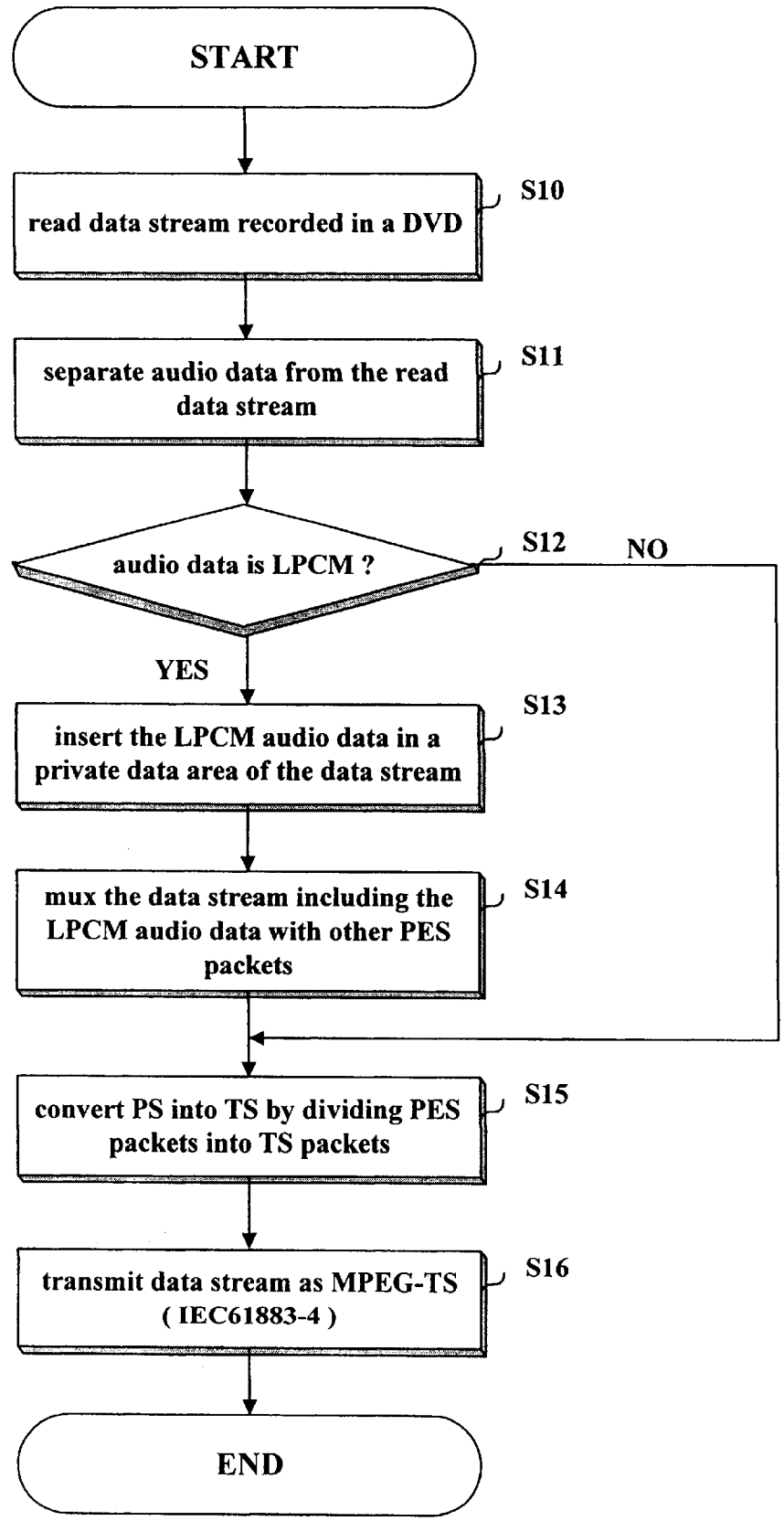
FIG. 2 is a flowchart of a method for transmitting a audio data stream through a digital interface in accordance with the present invention.

FIG. 2 is a flow chart embodying a method for transmitting audio data through a digital interface in accordance with the present invention. At first, the optical disk 1 such as a DVD is inserted into the DVD player 100. After data streams recorded in the optical disk 1 are read out by the optical pickup 2 (S10), the read data streams are processed by the demodulator 3 and the scrambler 4, then applied to both of the data parser 6 and the PS/TS converter 14 by the path selector 5. The data streams applied to the PS/TS converter 14 are separated into audio and video data therein.

The PS/TS converter 14 checks whether the separated audio data are LPCM audio data or not (S12), and if the data are LPCM audio, the PS/TS converter 14 inserts the audio data into the PES private data area of a PES packet without conducting decoding and MPEG re-encoding process.

After that, the PS/TS converter 14 multiplexes the PES packet having LPCM data with other PES packets of PS being inputted to it (S14), divides the multiplexed data streams into TS (S15) which is consisting of multiple TS packets, and transmits the TS packets through the interface sequentially (S16).

Figure 3:
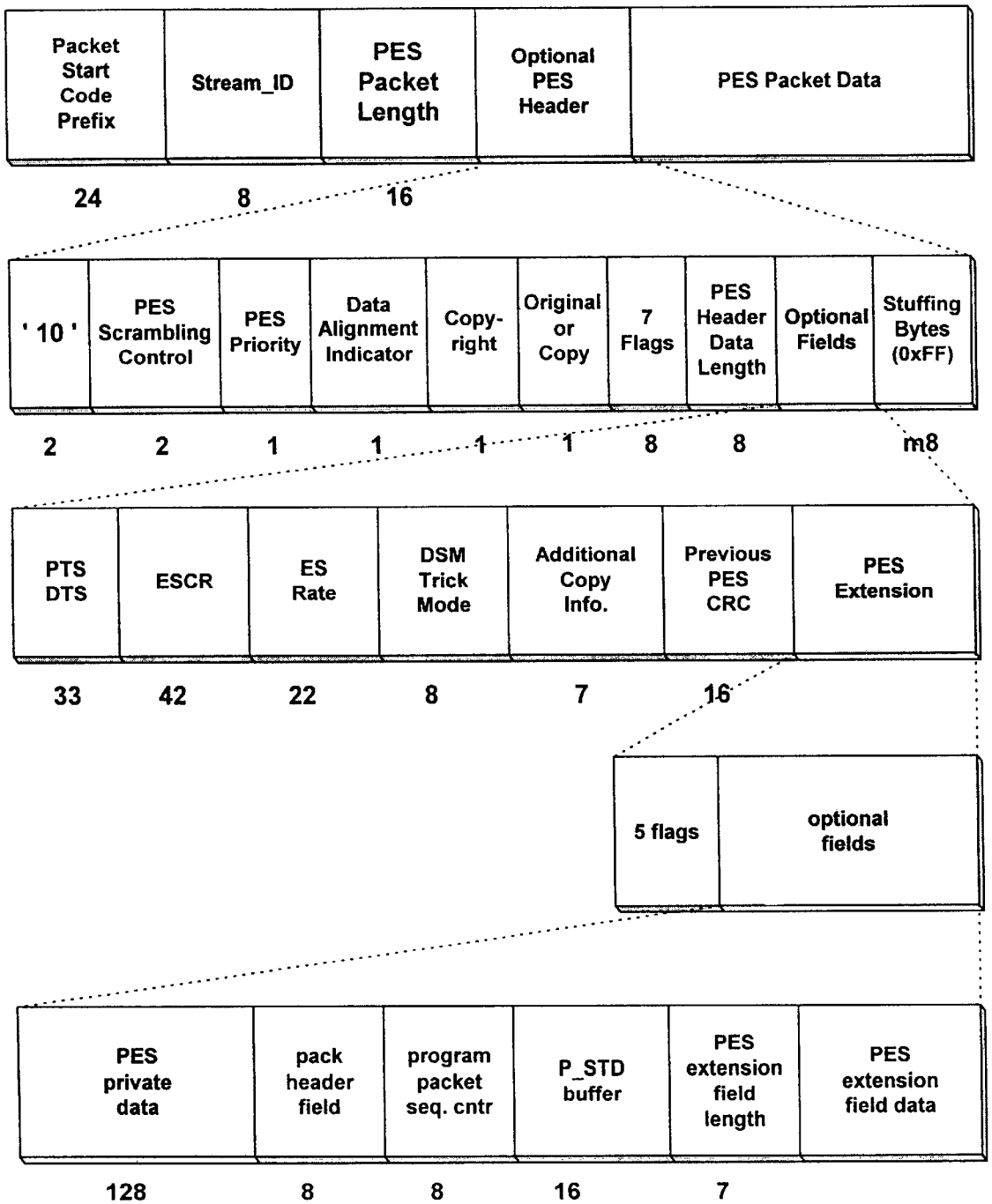
FIG. 3 is a pictorial representation showing the syntax of a data stream transmitted through a digital interface.

The PES private data area is space allocated in an optional field of a PES header as shown FIG. 3. This area is used for private data to be provided optionally as the need arises.

If the separated audio data is not LPCM audio but MPEG-formatted data, the PS/TS converter conducts conventional PS-to-TS converting process (S15) to segmenting the separated data streams into TS packets, and transmits them to the D-TV 200 (S16) which is connected through the digital interfaces 15 and 21.

For transmission of the transport streams consisting of TS packets, the IEEE 1394 interface uses the communication protocol of the IEC61883-4.

Figure 4:
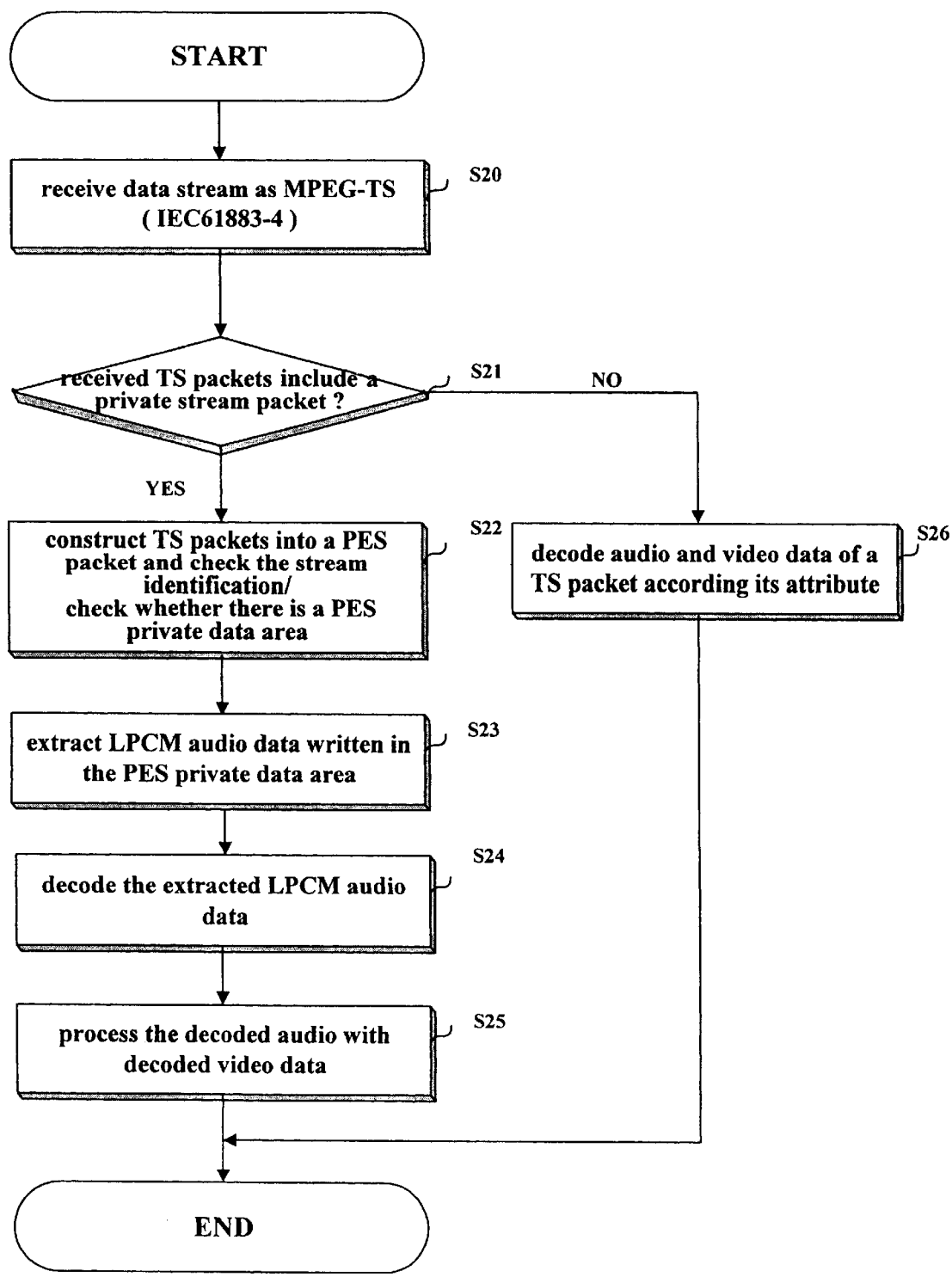
FIG. 4 is a flowchart of a method for receiving a audio data stream through a digital interface in accordance with the present invention.

FIG. 4 is a flow chart embodying a method for receiving audio data through a digital interface in accordance with the present invention.

When TS is transmitted from the DVD player 100 through the digital interfaces 15 and 21 as described above referring FIG. 2, the demux 23 of the D-TV 200 receives TS packets through the interface 21 (S20), acknowledges the attributes of the TS packets based upon the packet identification (PID), and distributes the data of TS packets to corresponding decoders in accordance with the acknowledged attributes. Then, the decoders 24 and 25 decodes the data of TS packets into the audio and video signals (S26). The packet attribute corresponding to each PID can be understood from the program specific information which is provided from the DVD player 100 before transmitting the presentation data containing audio and video data.

While distributing the TS packets, the demux 23 checks (S21) based upon PID whether there are transport packets different from MPEG streams. If the packets exist, the demux 23 reconstructs them into a PES packet and checks the Stream ID of the stream. If the value of Stream ID is for the private stream, the demux 23 checks again whether the private stream has the private data area based upon the value of 'PES header data length' field (S22). Then, the demux 23 searches for the PES private data area, retrieves LPCM audio data written in the PES private data area (S23), and applies the retrieved data to a corresponding decoder, if this decoder is equipped in the D-TV 200, to decode LPCM audio data (S24). The decoded LPCM audio signal is outputted together with video signals processed by the video decoder 25 (S25).

If there is no internal LPCM decoder, the retrieved LPCM audio data may be provided to a digital audio device through a digital audio port.

The private stream is identified based upon the Stream ID of the PES packets as explained above. In case that LPCM audio data are transceived as the private stream 1, the identifying value of $10111101_{(2)}$ should be inserted in the Stream ID field, and in case of private stream 2, the value of $10111111_{(2)}$ should be used, as shown on FIG. 5.

According to the above method, the DVD player 100 inserts LPCM audio data reproduced from a DVD into the PES private data area of PES stream for transmission, and the D-TV 200 checks Stream ID of the transport stream received through a digital interface, extracts LPCM audio data inserted in the PES private data area, and conducts operation appropriate to the extracted LPCM audio data.

According to the above operations and steps, the present invention prevents possible loss of audio data such as LPCM audio data caused from re-encoding operation as well as reduces device cost because it is not necessary to equip an additional encoder for re-encoding audio data into MPEG-formatted or AC3-formatted audio data.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for transmitting an audio data stream through a digital interface, comprising the steps of:
    (a) separating an audio data stream from data reproduced from a recording medium; and
    (b) inserting the separated audio data stream into a private data area of an MPEG-formatted data stream, and constructing the MPEG-formatted data stream containing the audio data stream in the private data area into packet of transmittal format together with other data.

2. A method according to claim 1, wherein the separated audio data stream includes linear-pulse-code-modulated audio data.

3. A method according to claim 1, wherein said step (b) divides the MPEG-formatted data stream containing the audio data stream in the private data area into data packets of which format is acceptable to a digital video displaying device connected through the digital interface.

4. A method according to claim 3, wherein the format acceptable to the digital video displaying device is an MPEG transport packet format.

5. An apparatus for transmitting an audio data stream through a digital interface, comprising:
    detecting means for detecting a digital data stream recorded on a recording medium;
    separating means for separating audio data from the detected data stream;
    converting means for constructing an MPEG-formatted data stream whose private data area is packed with the separated audio data and converting the constructed stream into packets of transmittal format together with the digital data stream from which audio data is separated; and
    transmitting means for sending the packets of transmittal format through the digital interface.

6. An apparatus according to claim 5, wherein the packets of the transmittal format are transport packets.

7. A method for transmitting an audio data stream through a digital interface, comprising the steps of:
    (a) reading a data stream recorded on a recording medium;
    (b) extracting audio data from the read data stream;
    (c) checking whether the extracted audio data has linear-pulse-code-modulated format;
    (d) constructing an MPEG-formatted data stream whose private data area contains the extracted audio data based upon the checked results;
    (e) multiplexing the constructed data stream with the digital data stream from which the audio data are excluded;
    (f) dividing the multiplexed digital data stream into transport packets of MPEG format; and
    (g) transmitting the transport packets through the digital interface.

8. An apparatus for transmitting an audio data stream through a digital interface, comprising:

(a) means for separating an audio data stream from data reproduced from a recording medium; and (b) means for inserting the separated audio data stream into a private data area of an MPEG-formatted data stream, and constructing the MPEG-formatted data stream containing the audio data stream in the private data area into packet of transmittal format together with other data.

9. An apparatus according to claim 8, wherein the separated audio data stream includes linear-pulse-code-modulated audio data.

10. A method for transmitting an audio data stream through a digital interface, comprising:

detecting a digital data stream recorded on a recording medium;

separating audio data from the detected data stream;

constructing an MPEG-formatted data stream whose private data area is packed with the separated audio data and converting the constructed stream into packets of transmittal format together with the digital data stream from which audio data is separated; and for sending the packets of transmittal format through the digital interface.

11. A method according to claim 10, wherein the packets of the transmittal format are transport packets.

12. An apparatus for transmitting an audio data stream through a digital interface, comprising:

(a) means for reading a data stream recorded on a recording medium;

(b) means for extracting audio data from the read data stream;

(c) means for checking whether the extracted audio data has linear-pulse-code-modulated format;

(d) means for constructing an MPEG-formatted data stream whose private data area contains the extracted audio data based upon the checked results;

(e) means for multiplexing the constructed data stream with the digital data stream from which the audio data are excluded;

(f) means for dividing the multiplexed digital data stream into transport packets of MPEG format; and (g) means for transmitting the transport packets through the digital interface.

* * * * *